United States Patent [19]

Uchida et al.

[11] Patent Number: 4,913,839

[45] Date of Patent: Apr. 3, 1990

[54] FERROELECTRIC LIQUID CRYSTAL POLYMER

[75] Inventors: Shunji Uchida; Kazuharu Morita, both of Sodegaura; Kenji Hashimoto, Ichihara, all of Japan

[73] Assignee: Idemitsu Kosan Co., Ltd., Tokyo, Japan

[21] Appl. No.: 340,033

[22] Filed: Apr. 18, 1989

Related U.S. Application Data

[62] Division of Ser. No. 383, Dec. 22, 1986, Pat. No. 4,844,835.

[30] Foreign Application Priority Data

Dec. 26, 1985 [JP] Japan ................................ 60-292274
May 27, 1986 [JP] Japan ................................ 61-120313
May 29, 1986 [JP] Japan ................................ 61-122155
Sep. 17, 1986 [JP] Japan ................................ 61-217235

[51] Int. Cl.$^4$ .................... C09K 19/52; C08F 122/14
[52] U.S. Cl. .......................... 252/299.01; 252/299.65; 350/350.5; 526/313; 526/320
[58] Field of Search .................... 252/299.01, 299.65; 350/350.5; 526/313, 320

[56] References Cited

U.S. PATENT DOCUMENTS

| | | | |
|---|---|---|---|
| 4,101,207 | 7/1978 | Taylor et al. | 252/299.01 |
| 4,293,435 | 10/1981 | Portugall et al. | 252/299.01 |
| 4,358,391 | 11/1982 | Finkelmann et al. | 252/299.01 |
| 4,576,732 | 3/1986 | Isogai et al. | 252/299.65 |
| 4,596,667 | 6/1986 | Inukai et al. | 252/299.65 |
| 4,613,209 | 9/1986 | Goodby et al. | 350/350.5 |
| 4,631,328 | 12/1986 | Ringsdorf et al. | 252/299.01 |
| 4,657,694 | 4/1987 | Heeger et al. | 252/299.01 |
| 4,661,576 | 4/1987 | Decobert et al. | 526/313 |
| 4,696,990 | 9/1987 | Noonan et al. | 252/299.01 |
| 4,702,558 | 10/1987 | Coles et al. | 252/299.01 |

OTHER PUBLICATIONS

Gray et al., Polymer Liquid Crystals, pp. 2-4, 24-31 (1982).
Finkelmann et al., Polymer Liquid Crystals, pp. 44-46 (1982).

*Primary Examiner*—John F. Terapane
*Assistant Examiner*—J. E. Thomas

*Attorney, Agent, or Firm*—Antonelli, Terry & Wands

[57] ABSTRACT

A ferroelectric liquid crystal polymer comprising the recurring units represented by the following general formula:

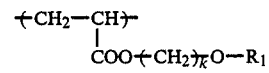

in which
k is an integer of from 1 to 30,
$R_1$ is

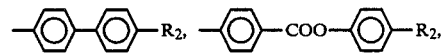

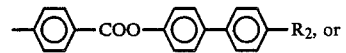

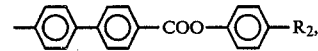

$R_2$ is —COOR$_3$, —OCOR$_3$, —OR$_3$, or —R$_3$,
in which
$R_3$ is

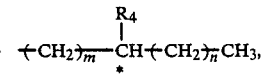

$R_4$ is —CH$_3$ or Cl,
m is 0 or an integar of from 1 to 10,
n is 0 or an integar of from 1 to 10, providing that n is not 0, when $R_4$ is —CH$_3$.

The ferroelectric liquid crystal polymer of the present invention not only exhibits a ferroelectricity even at temperatures in the vicinity of a room temperature, but also has so fast response speed to the external factors as to be able to display motion pictures, and may be advantageously used as display elements for large size screens and a curved screens.

17 Claims, No Drawings

FERROELECTRIC LIQUID CRYSTAL POLYMER

This is a division of application Ser. No. 000,383, filed Dec. 22, 1986, now U.S. Pat. No. 4,844,835.

BACKGROUND OF THE INVENTION

(1) Industrial Field of the Invention

The present invention relates to a novel ferroelectric liquid crystal polymer. More precisely, the present invention relates to a ferroelectric liquid crystal polymer which is useful in the optoelectronics field, particularly for various kinds of electronic optical devices, such as, display elements for electronic desk calculators, clocks, and watches, electronic optical shutters, electronic optical diaphragms, optical modulators, optical-path transfer switches in optical communication systems, memories, printer heads, and varifocal lenses, and which not only exhibits a ferroelectricity even at temperatures in the vicinity of a room temperature, but also has so fast response speed as to be able to display motion pictures, and also may be advantageously used as display elements for large size screens and curved screens.

(2) Description of the Prior Art

Heretofore, display elements employing low molecular liquid crystal has been widely used for digital elements for electric desk calculators, clocks, watches, and the like. In these fields for utilization, generally, the conventional low molecular liquid crystal has been disposed between two glass substrates precisely spaced in a micron order to be used. However, the adjustment of such a space has been impossible to be realized for large size screens and curved screens. In order to solve the said difficult problems, it has been undertaken, as one way, to develop polymeric liquid crystal, which can be molded itself (J. Polym. Sci., Polym. Lett., Ed. 13, 243 (1975), Polym. Bull., 309, 6 (1982), Japanese Patent Laid-Open No. 21479/1980, etc.).

However, these liquid crystal polymers generally have a low response speed of the changes of the transmission intensity and the like to the changes of the external factors such as electric field, and therefor, none of them have been satisfactory.

Further, regarding to the liquid crystal polymer disclosed in the above mentioned Japanese Patent Laid-Open, the polymer itself does not exhibits the properties of liquid crystal at a room temperature, and therefor, has disadvantage such that it should be heated at a temperature range above its glass transition temperature and less than the clearing temperature.

SUMMARY OF THE INVENTION

The object of the present invention is to provide a ferroelectric liquid crystal polymer which not only exhibits a ferroelectricity even at temperatures in the vicinity of a room temperature, but also has so fast response speed to the external factors as to be able to display motion pictures, and also may be advantageously used as display elements for large size screens and curved screens.

The polymer of the present invention is characterized by comprising the recurring units represented by the following general formula;

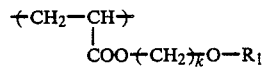

in which
K is an integer of from 1 to 30,
$R_1$ is

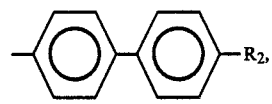

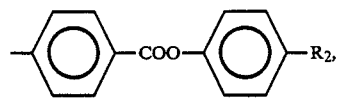

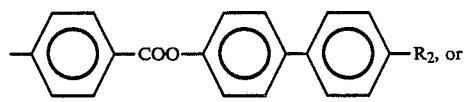

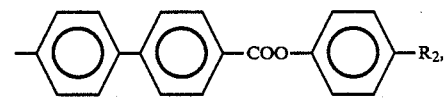

$R_z$ is —COOR$_3$, —OCOR$_3$, —OR$_3$, or —R$_3$,
in which
$R_3$ is

$R_4$ is —CH$_3$ or Cl,
m is 0 or an integar of from 1 to 10, and n is 0 or an integar of from 1 to 10, providing that n is not 0, when $R_4$ is —CH$_3$.

The number average molecular weight of the polymer of the present invention is preferably from 3,000 to 400,000, more preferably from 5,000 to 400,000. When it is less than 3,000, the moldability of the said polymer as film or coated film sometimes deteriorated, on the other hand, when it exceeds 400,000, there sometimes occurs undesirable effects such as a elongated response time. Particularly preferably range of the number average molecular weight cannot be prescribed uniformly since it depends on the kind of R$_1$, the value of k, the optical purity of R$_3$, and the like, but it is usually from 5,000 to 200,000.

Hereinafter, general synthetic method for the polymer of the present invention is described.

The polymer of the present invention may be obtained by polymerizing the monomer represented by the following formula;

in which, k, R$_1$, R$_2$, R$_3$, R$_4$, m, and n are the same as defined above, by known method.

In the formula [I], the value of k is preferably from 2 to 20, more preferably from 11 to 20.

Further, the polymer in which $R_1$ is

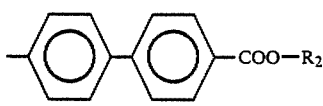

in the formula [I] and, when k is an integar of from 1 to 10, the polymer in which $R_1$ is

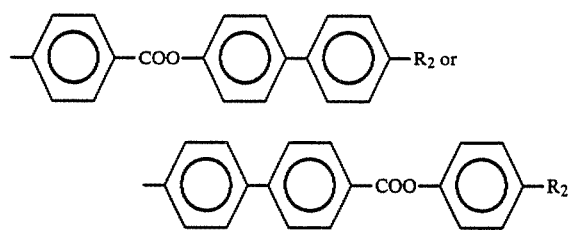

are preferable. Also, the polymer in which $R_3$ is

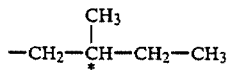

is preferable.

For example, the above said monomers may be obtained as follows.

A monomer in which $R_1$ is

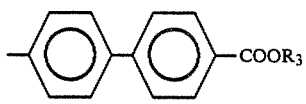

As shown by the following equation, after a halogenoester compound (III) has been formed by reacting acrylic acid with an alkylene dihalide (II), ester (IV) derived from 4'-hydroxybiphenyl-4-carboxylic acid and an optically active alcohol is reacted with the above halogenoester compound (III) to obtain the objective monomer.

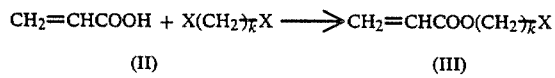

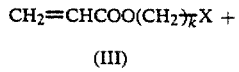

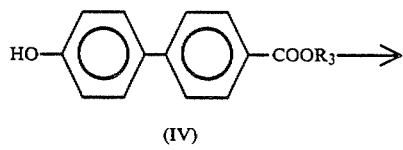

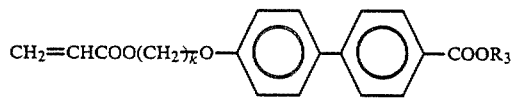

The above said reaction of acrylic acid and an alkylene dihalide (II) is carried out by heating them at a desired temperature in a suitable solvent, such as, dimethylformamide, in the presence of a catalyst, such as, tetramethylammonium hydroxide. Preferable alkylene dihalides to be used at the time are bromide compounds including, for example, methylene dibromide, 1,2-dibromoethane, 1,3-dibromopropane, 1,4-dibromobutane, 1,5-dibromopentane, 1,6-dibromohexane, 1,7-dibromoheptane, 1,8-dibromooctane, 1,9-dibromononane, 1,10-dibromodecane, 1,12-dibromododecane, 1,14-dibromotetradecane, 1,15-dibromopentadecane, 1,16-dibromohexadecane, and 1,20-dibromoeicosane.

The above said ester (IV) of 4'-hydroxybiphenyl-4-carboxylic acid and an optically active alcohol may be obtained by reacting 4'-hydroxybiphenyl-4-carboxylic acid with an optically active alcohol (V), such as (R)-2-methylbutanol, (S)-2-methylbutanol, (R)-2-chlorobutanol, (S)-2-chlorobutanol, (R)-2-methylpentanol, (S)-2-methylpentanol, (R)-3-methylpentanol, (S)-3-methylpentanol, (R)-4-methylhexanol, (S)-4-methylhexanol, (R)-2-chloropropanol, (S)-2-chloropropanol, (R)-1-methylheptanol, (S)-1-methylheptanol, (R)-6-methyloctanol, and (S)-6-methyloctanol, at a desired temperature, in a suitable solvent, such as, benzene, in the presence of an esterification catalyst, such as, conc. sulfuric acid or p-toluenesulfonic acid. As the optically active alcohol, (R)-2-methylbutanol and (S)-2-methylbutanol are preferably used.

The above mentioned reaction of the halogenoester compound (III) with the ester (IV) derived from 4'-hydroxybiphenyl-4-carboxylic acid and the optically active alcohol is carried out by heating them at a desired temperature, in a suitable solvent, such as, acetone, in the presence of an alkali, such as, potassium hydroxide, sodium hydroxide, potassium carbonate, and sodium carbonate.

A monomer in which $R_1$ is

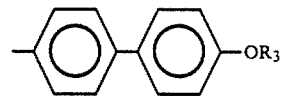

As shown in the following equation, the above said alcohol (V) is halogenized, and the reaction product is reacted with 4,4'-dihydroxybiphenyl to obtain an ether compound (VI), then the above said halogenoester compound (III) is reacted with the ether compound (VI), to obtain the objective monomer.

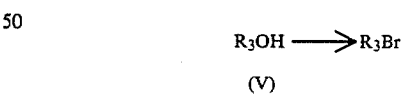

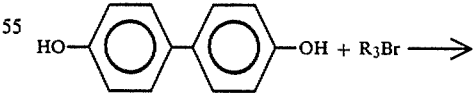

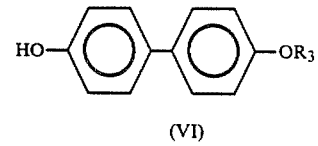

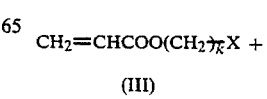

-continued

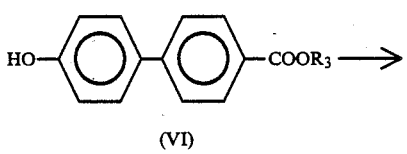
(VI)

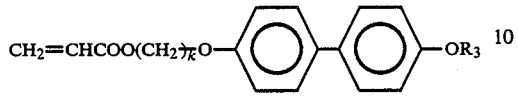

A monomer in which $R_1$ is

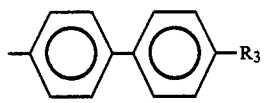

As shown in the following equation, after a biphenyl derivative (VII) is formed, it is reacted with the above halogenoester compound (III) to obtain the objective monomer.

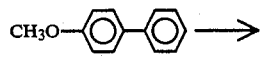

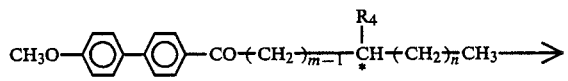

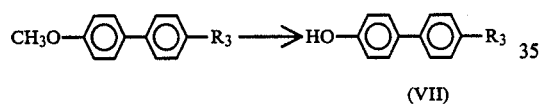
(VII)

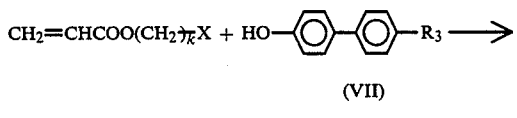
(VII)

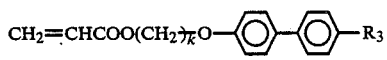

A monomer in which $R_1$ is

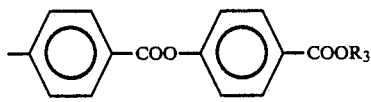

As shown in the following equation, after a 4-hydroxybenzoic acid ester (VIII) is formed, it is reacted with the above halogenoester compound (III) to obtain the objective monomer.

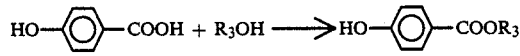

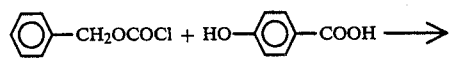

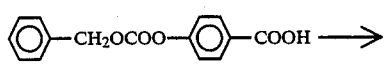

-continued

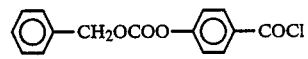

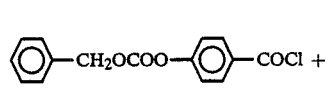

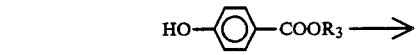

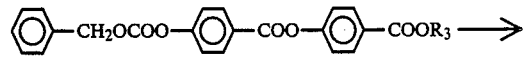

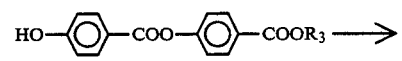
(VIII)

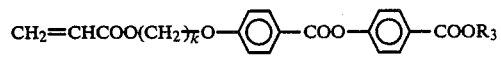

A monomer in which $R_1$ is

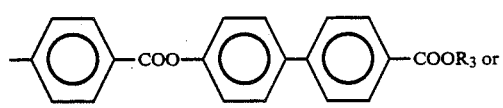

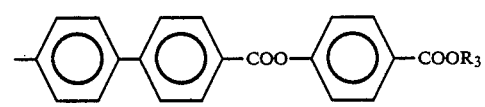

Such a monomer may be synthesized using acrylic acid, an alkylene dihalide (II), an optically active alcohol $HOR_3$ (V),

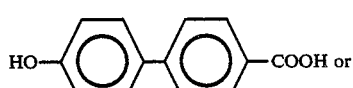

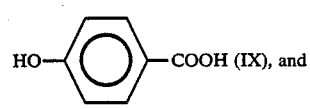

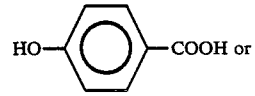

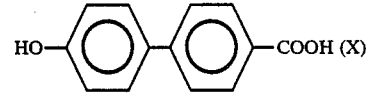

as the starting materials.
A compound (IX) and an optically active alcohol (V) is reacted to synthesize an ester compound (XI), i.e.

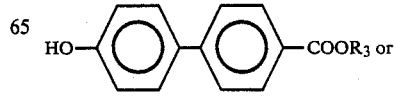

-continued

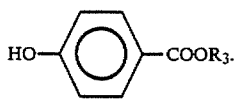

Then, a compound (X) is reacted with the ester compound (XI) to synthesize an ester compound (XII), i.e.

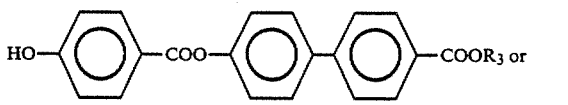

However, when 40'-hydroxybiphenyl-4-carboxylic acid is used as the compound (IX), 4-hydroxybenzoic acid should be used as the compound (X), and, on the other hand, when 4-hydroxybenzoic acid is used as the compound (IX), 40'-hydroxybiphenyl-4-carboxylic acid should be used as the compound (X).

Finally, the objective monomer is obtained by reacting the above said halogenoester compound (III) with the above said ester compound (XII).

A monomer in which $R_1$ is

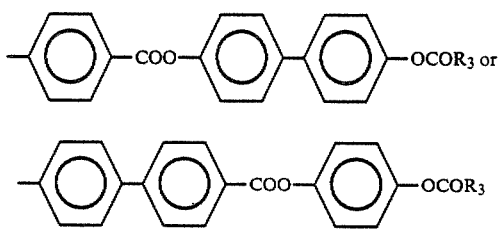

Such a monomer may be synthesized using acrylic acid, an alkylene dihalide (II), an optically active carboxylic acid HOOCR$_3$(XIII),

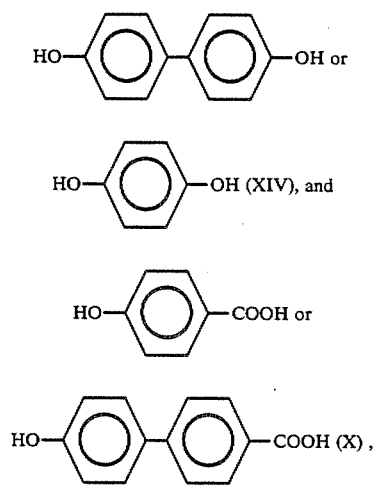

as the starting materials.

The compounds (XIII) include, for example, various carboxylic acids having a structure wherein the hy- droxyl group is replaced by a carboxyl group in the compound (V), and the like.

The objective monomer may be synthesized by reacting these compounds successively in the same way as in the synthesis of the above said monomer.

However, when 4,4'-dihydroxybiphenyl is used as the compound (XIV), 4-hydroxybenzoic acid should be used as the compound (X), and, on the other hand, when hydroquinone is used as the compound (XIV), 4'-hydroxybiphenyl-4-carboxylic acid should be used as the compound (X).

Then, one or more of the monomers thus obtained are polymerized to synthesize the liquid crystal polymers of the present invention, and at the time, as the polymerization method, any known method, for example, heat radical polymerization, radical polymerization using an initiator, radical polymerization using ultraviolet light or radiation, and anion polymerization using an initiator such as butyllithium, may be employed.

Various kinds of initiators are known as the initiator for radical polymerization, however, a medium temperature-type initiator, such as, benzoyl peroxide, peracetic acid, lauroyl peroxide, and azobisisobutyronitrile (AIBN), may be suitably used.

As the polymerization system, various systems, such as bulk polymerization, slurry polymerization, and solution polymerization are known, and anyone may be employed.

The polymerization temperature is not uniform because it varies depending on the polymerization process, especially on the kind of the initiator, but, usually a temperature of from 50° to 90° C. is suitable.

The polymerization time varies depending on other factors such as the polymerization temperature, but it is usually from 1 to 20 hours.

The control of the molecular weight can be achieved by the addition of a known molecular weight controlling agent and/or the control of the concentration of the initiator to the monomer (usually not more than 5%).

In bulk polymerization system, the polymer of the present invention may also be directly fixed between the substrates, such as glass plates, in an adhered state by sufficiently mixing the above said monomer and the initiator, then introducing the mixture between two substrates in the absence of oxygen, and heating.

As the solvent to be used in slurry polymerization system and solution polymerization system, any known inert solvent may be used, and inter alia, tetrahydrofuran and aromatic solvents, such as benzene, toluene, and xylene, are suitably used.

The polymer thus obtained can be used as a film formed by a known film forming technique, for example, casting technique, T-dye technique, inflation technique, calender technique, and stretching technique. The polymer in the form of film is usable in various fields of optoelectronics, such as, liquid crystal displays, electronic optical shutters, and electronic optical diaphragms, by disposing between two large size glass substrates, curved glass substrates, polyester films, and the like, not to mention two usual glass substrates. Further, the polymer may also be formed directly into film adhered on a substrate by applying a polymer solution disolved in a suitable solvent on a surface of the substrate and then evaporating the solvent.

According to the measurement of the phase transition temperature, it was confirmed that the polymer of the present invention converts to chiral smectic C phase state at a relatively low temperature, i.e. 5° to 122° C., and at a wide range of temperature. Also, it was confirmed that the response time at temperatures in the vicinity of a room temperature is fast, i.e. from 0.03 to 0.18 sec.

Since the typical property of polymers, i.e. the moldability, and the property of smectic phase liquid crystal are combined in the polymer of the present invention, there is a possibility of many application in the fields of integrated optics, optoelectronics, and information memory. For example, the polymer of the present invention may be used as various kinds of electronic optical devices, such as, liquid crystal displays for digital displays of various forms, electronic optical shutters, electronic optical switches such as optical-path transfer switches in optical communication systems, electronic optical diaphragms, memory elements, optical modulators, printer heads, and varifocal lenses.

Further, in case of necessity, the polymer of the present invention may be improved by various treating methods well known in this industry, such as, the mixing of polymers of the present invention, the mixing with other polymers, the addition of additives such as inorganic or organic compounds and metals including a stabilizer, a plastisizer, and the like.

EXAMPLE 1 to 28

Hereinafter, the present invention is described in more details, with reference to the Examples, but the present invention is not to be limited by these Examples.

The structure of the obtained polymer was determined by NMR, IR, and elementary analysis, and the measurement of the phase transition temperature was carried out by DSC, and the determination of the phase was carried out using a polarizing microscope. Further, the electric field response speed was measured as follows.

Measurement of the electric field response speed

A polymer was disposed between two ITO substrates (20×10 mm) and adjusted to 25 μm thick by a spacer, then an alternating current electric field $E=4\times10^6$ V/m was applied, and at the same time, the response time of the changes of the transmission intensity (0→90%) was measured.

The phase states were represented by the following abbriviations. (Cry: crystal, Iso: isotropy, SmA: smectic A phase, SmC*: chiral smectic C phase, S$_1$: unidentified smectic phase liquid crystal state, g: glass state) Further, the numbers represent the phase transition temperature in °C.

EXAMPLE 1

Synthesis of acrylic acid 2-bromoethyl ester 0.2 mole (14.1 g) of acrylic acid, 0.22 mole (40.0 g) of tetramethylammonium hydroxide pentahydrate, and 0.6 mole (113 g) of 1,2-dibromoethane were reacted for 10 hours in 300 ml of DMF. The reaction solution was ether extracted after the addition of 300 ml of water, then purified by column chromatography to obtain 26.8 g of the objective bromoester compound (1a). (yield: 75%)

Synthesis of 4'-hydroxybiphenyl-4-carboxylic acid 2-methylbutyl ester 93 m moles (20 g) of 4'-hydroxybiphenyl-4-carboxylic acid and 467 m moles (41 g) of (S)-(−)-2-methylbutanol were refluxed for 25 hours in 150 ml of benzene in the presence of 2 ml of con. sulfuric acid. Thereafter, the reaction solution was concentrated, and then recrystallized from a toluene-hexane mixed solvent to obtain 26.0 g of hydroxyester compound (2) [m.p. 116.2°–117.8 °C., $[\alpha]_D^{23}=+4.35°$ (CHCl$_3$)]. (yield: 98%)

Synthesis of 4'-(2-acryloyloxyethoxy)biphenyl-4-carboxylic acid 2-methylbutyl ester A mixture of 20 m moles (3.6 g) of the above bromoester compound (1a), 18 m moles (5.1 g) of hydroxyester compound (2), and 72 m moles (10 g) of potassium carbonate was refluxed for 10 hours in acetone. Then, the reaction solution was filtered. The filtrate was concentrated, and recrystallized from ethanol, to obtain 4.8 g of the objective monomer (3a) [[$\alpha]_D^{23}=+3.48°$ (CHCl$_3$)]. (yield: 70%)

[phase transition behavior Cry $\xrightarrow{53}$ Iso $\xrightarrow{49}$

SmA $\xrightarrow{41}$ Cry].

Synthesis of polymer 1.31 m moles (500 mg) of the above monomer (3a) was reacted for 12 hours at 60° C. in 5 ml of THF (tetrahydrofuran) using 3.2 mg of AIBN (azobisisobutyronitrile) as the polymerization initiator. Then, the polymerization reaction product was purified by column chromatography to obtain 360 mg of the objective polymer having Mn (number average molecular weight, PS conversion) of 8.300. (conversion percentage; 72%)

With respect to the obtained polymer, the recurring unit, the phase transition behavior, and the electric field response time and the measuring temperature thereof are shown in Table. (the same with the following Examples)

EXAMPLE 2

Synthesis of acrylic acid 6bromohexyl ester 0.2 mole (14.1 g) of acrylic acid, 0.22 mole (40.0 g) of tetramethylammonium pentahydrate, and 0.6 mole (146 g) of 1,6-dibromohexane were reacted for 10 hours in 300 ml of DMF, and then treated in the same manner as in Example 1, to obtain 33.8 g of the objective bromoester compound (1b). (yield: 72%)

Synthesis of 4'-(6-acryloyloxyhexyloxy)biphenyl-4-carboxylic acid 2-methylbutyl ester A mixture of 20 m moles (4.7 g) of the above bromoester compound (1b), 18 m moles (5.1 g) of the hydroxyester compound (2) obtained in Example 1, and 72 m moles (10 g) of potassium carbonate was refluxed for 10 hours in acetone, and then treated in the same manner as in Example 1, to obtain 4.8 g of the objective monomer (3b) [[$\alpha]_D^{23}=+3.14°$ (CHCl$_3$)]. (yield: 61%)

[phase transition behavior Cry $\xrightarrow{28}$ SmA $\xrightarrow{36}$ Iso $\xrightarrow{32}$ SmA $\xrightarrow{13}$ SmC* $\xrightarrow{-7}$ Cry]

Synthesis of polymer 1.14 m moles (500 mg) of the above monomer (3b) was reacted for 15 hours at 60° C. in 5 ml of THF using 2.8 mg of AIBN as the polymerization initiator, and then treated in the same manner as in Example 1, to obtain 370 mg of a polymer having Mn of 6,500. (conversion percentage: 74%)

EXAMPLE 3

Synthesis of acrylic acid 10-bromodecyl ester 0.2 mole (14.1 g) of acrylic acid and 0.22 mole (40.0 g) of tetramethylammonium hydroxide pentahydrate were stirred for two hours in 300 ml of DMF to be homogenized, then 0.4 mole (120 g) of 1,10-dibromodecane was added thereto and further stirred for 10 hours. Then, the same treatment as in Example 1 was carried out to obtain 30.9 g of the objective bromoester compound (1c). (yield: 53%)

Synthesis of
4'-(10-acryloyloxydecyloxy)biphenyl-4-carboxylic acid
2-methylbutyl ester A mixture of 20 m moles (5.6 g) of the above bromoester compound (1c), 18 m moles (5.1 g) of the hydroxyester compound (2) obtained in Example 1, and 72 m moles (10 g) of potassium carbonate was refluxed for 10 hours in acetone. Then, the reaction solution was filtered. The filtrate was concentrated, and then recrystallized from ethanol to obtain 4.6 g of the objective monomer (3c) [[$\alpha$]$_D^{23}$ = +2.88° (CHCl$_3$)]. (yield: 52%)

[phase transition behavior Cry $\xrightarrow{40}$ Iso $\xrightarrow{32}$

SmA $\xrightarrow{14}$ Cry]

Synthesis of polymer 1.01 m moles (500 mg) of the above monomer (3c) was reacted for 12 hours at 60° C. in 5 ml of THF using 2.5 mg of AIBN as the polymerization initiator. Then, the polymerization reaction product was purified by column chromatography to obtain 300 mg of a polymer (a) having Mn of 6,300. (conversion percentage; 60%)

Further, 1.01 m moles (500 mg) of the monomer (3c) was reacted for 60 hours at room temperature in 5 ml of DMF using 2.5 mg of V-70 (produced by Wako Junyaku Col, Ltd.) as the polymerization initiator. Then the same after-treatment as above mentioned was carried out to obtain 220 mg of a polymer (b) having Mn of 42,000. (conversion percentage: 44%)

EXAMPLE 4

Synthesis of acrylic acid 12-bromododecyl ester 0.21 mole (14.8 g) of acrylic acid and 0.23 mole (41.8 g) of tetramethylammonium hydroxide pentahydrate were stirred for two hours in 300 ml of DMF to form a homogeneous solution, and then 0.21 mole (77.4 g) of 1,12-dibromododecane was added thereto and further stirred for 10 hours. Then, the same treatment as in Example 1 was carried out to obtain 24.6 g of the objective bromoester compound (1d). (yield: 37%)

Synthesis of
4'-(12-acryloyloxydodecyloxy)biphenyl-4-carboxylic
acid 2-methylbutyl ester A mixture of 15.8 m moles (5.0 g) of the bromoester compound (1d), 14.2 m moles (4.0 g) of the hydroxyester compound (2) obtained in Example 1, and 56.8 m moles (7.9 g) of potassium carbonate was refluxed for 16 hours in acetone. Then, the reaction solution was filtered. The filtrate was concentrated, and then recrystallized from ethanol, to obtain 3.7 g of the objective monomer (3d) [[$\alpha$]$_D^{23}$ = +2.79° (CHCl$_3$)]. (yield: 50%)

[phase transition behavior Cry $\xrightarrow{54.8}$ Iso $\xrightarrow{43.7}$

SmA $\xrightarrow{42.5}$ Cry]

Synthesis of polymer 1.15 m moles (600 mg) of the above monomer (3d) was reacted for 14 hours at 60° C. in 4 ml of THF using 2.5 mg of AIBN as the polymerization initiator. The polymerization reaction product was purified by column chromatography to obtain 490 mg of a polymer having Mn of 6,500. (conversion percentage: 82%)

EXAMPLE 5

Synthesis of acrylic acid 14-bromotetradecyl; ester 0.15 moles (10.8 g) of acrylic acid and 0.15 mole (27.2 g) of tetramethylammonium hydroxide pentahydrate were stirred for two hours in 500 ml of DMF, then 0.23 mole (81.9 g) of 1,14-dibromotetradecane was added to the reaction solution, and stirred for four hours. The reaction solution was ether extracted after the addition of 300 ml of water, dried, and concentrated, thereafter purified by column chromatography, to obtain 32.3 g of the objective bromoester compound (1e). (yield: 62%)

Synthesis of
4'-(14-acryloyloxytetradecyloxy)biphenyl-4-carboxylic
acid 2-methylbutyl ester A mixture of 46.3 m moles (16.1 g) of the bromoester compound (1e), 55.6 m moles (15.8 g) of the hydroxyester compound (2) obtained in Example 1, and 0.18 mole (24.9 g) of potassium carbonate was refluxed for 8 hours in acetone. The reaction solution was filtered. The filtrate was concentrated, and then recrystallized from ethanol to obtain 12.3 g of the objective monomer (3e) [[$\alpha$]$_D^{23}$ = +4.35° (CHCl$_3$)]. (yield: 48%)

Synthesis of polymer 1.09 m moles (0.6 g) of the above monomer (3e), 2.5 mg of AIBN, and 10 ml of dry THF were freeze-deaerated, then reacted for 16 hours at 60° C. After the reaction, the reaction solution was concentrated and diluted with chloroform (20 ml/g), then purified by high speed liquid chromatography, to obtain 0.5 g of a polymer having Mn of 7,000. (conversion percentage: 80%)

EXAMPLE 6

Synthesis of acrylic acid 16-bromohexadecyl ester 0.20 mole (14.4 g) of acrylic acid and 0.22 mole (39.86 g) of tetramethylammonium hydroxide pentahydrate were stirred for two hours in 500 ml of DMF, then 0.30 mole (115.26 g) of 1,16-dibromohexadecane was added to the reaction solution, and stirred for four hours. After the addition of 300 ml of water, the reaction solution was ether extracted, dried, and concentrated, then purified by column chromatography, to obtain 30.8 g of the objective bromoester compound (1f) [m.p. 62.7°–64.6° C.]. (yield: 41%)

Synthesis of 4'-(16-acryloyloxyhexadecyloxy)biphenyl-4-carboxylic acid 2-methylbutyl ester A mixture of 74.9 m moles (28.1 g) of the bromoester compound (1f), 74.9 m moles (21.3 g) of the hydroxyester compound (2) obtained in Example 1, and 0.3 mole (41.5 g) of potassium carbonate was refluxed for 8 hours in acetone to obtain 22.5 g of the objective monomer (3f) $[[\alpha]_D^{23} = +2.88°$ (CHCl$_3$)]. (yield: 52%)

Synthesis of polymer 1.04 m moles (0.6 g) of the monomer (3f), 2.4 mg of AIBN, and 10 ml of dry THF were freeze-deaerated, then reacted for 16 hours at 60° C. After the reaction, the reaction solution was concentrated, and diluted with chloroform (20 ml/g), and then purified by high speed liquid chromatography, to obtain 0.43 g of a polymer having Mn of 7,000, (conversion percentage; 72%)

EXAMPLE 7

Synthesis of acrylic acid 20-bromoeicosyl ester 0.15 mole (10.8 g) of acrylic acid and 0.15 mole (27.2 g) of tetramethylammonium hydroxide pentahydrate were stirred for two hours in 500 ml of DMF, then 0.23 mole (101.3 g) of 1,20-dibromoeicosane was added to the reaction solution, and stirred for four hours. After the addition of 300 ml of water, the reaction solution was ether extracted, dried, and concentrated, and then purified by column chromatography, to obtain 29.8 g of the objective bromoester compound (1g) [m.p. 39.8°–41.6° C.]. (yield: 46%)

Synthesis of 4'-(20-acryloyloxyeicosyloxy)biphenyl-4-carboxylic acid 2-methylbutyl ester A mixture of 46.3 m moles (20.0 g) of the bromoester compound (1g), 55.6 m moles (15.8 g) of the hydroxyester compound (2) obtained in Example 1, and 0.18 mole (24.9 g) of potassium carbonate was refluxed for 8 hours in acetone to obtain 12.9 g of the objective monomer (3g) $[[\alpha]_D^{23} = +2.83°$ (CHCl$_3$)]. (yield: 44%)

Synthesis of polymer 0.94 m mole (0.6 g) of the monomer (3g), 2.3 mg of AIBN, and 10 ml of dry THF were freeze-deaerated, thereafter reacted for 16 hours at 60° C. After the reaction, the reaction solution was concentrated and diluted with chloroform (20 ml/g), and then purified by high speed liquid chromatography, to obtain 0.19 g of a polymer having Mn of 6,000. (yield: 32%)

EXAMPLE 8

Synthesis of 4'-hydroxybiphenyl-4-carboxylic acid 6-methyloctyl ester 0.1 mole (20.6 g) of 1-bromo-6-methyloctane synthesized from (S)-(−)-amyl alcohol and 0.05 mole (10.7 g) of 4'-hydroxybiphenyl-4-carboxylic acid were refluxed for 8 hours in 200 ml of toluene in the presence of 0.5 ml of conc. sulfuric acid. Thereafter, the reaction solution was concentrated, and then purified by column chromatography to obtain 9.4 g of hydroxyester compound. (yield: 55%)

Synthesis of 4'-(12-acryloyloxydodecyloxy)biphenyl-4-carboxylic acid 6-methyloctyl ester A mixture of 25 m moles (8.0 g) of the bromoester compound (1d) obtained in Example 4, 25 m moles (8.5 g) of the above hydroxyester compound, and 0.1 mole (13.9 g) of potassium carbonate was refluxed for 10 hours in acetone. Then the reaction solution was filtered. The filtrate was concentrated, and then recrystallized from ethanol, to obtain 6.9 g of the objective monomer (3h) $[[\alpha]_D^{23} = +2.11°$ (CHCl$_3$)]. (yield: 48%)

Synthesis of polymer 0.86 m mole (0.50 g) of the monomer (3h), 2.1 mg of AIBN, and 5 ml of dry THF were freeze-deaerated, and then reacted for 16 hours at 60° C. The reaction product was concentrated, and then purified by column chromatography, to obtain 0.28 g of a polymer having Mn of 6,800. (conversion percentage: 56%)

EXAMPLE 9

Synthesis of 4'-(2-methylbutyryloxy)-4-hydroxybiphenyl 0.2 mole (37.2 g) of 4,4'-dihydroxybiphenyl and 0.1 mole (12.0 g of (S)-(+)-2-methylbutyryl chloride were stirred for three hours in 100 ml of pyridine. After the addition of water, the reaction solution was ether extracted, and then purified by column chromatography, to obtain 16.8 g of the hydroxyester compound. (yield: 79%)

Synthesis of 4'-(12-acryloyloxydodecyloxy)-4-(2-methylbutyryloxy)biphenyl

A mixture of 40 m moles (12.8 g) of the bromoester compound (1d) obtained in Example 4, 40 m moles (8.6 g) of the above hydroxyester compound, and 0.2 moles (27.8 g) of potassium carbonate was refluxed for 10 hours in acetone. Then, the reaction solution was filtered. The filtrate was concentrated, and then recrystallized from ethanol to obtain 9.6 g of the objective monomer (3i) $[[\alpha]_D^{23} = +7.83°$ (CHCl$_3$)]. (yield: 53%)

Synthesis of polymer 1.1 m moles (0.50 g) of the monomer (3i), 2.7 mg of AIBN, and 5 ml of dry THF were freeze-deaerated, and then reacted for 16 hours at 60° C. The reaction product was concentrated, and then purified by column chromatography, to obtain 0.31 g of a polymer having Mn of 7,200. (conversion percentage: 62%)

EXAMPLE 10

Synthesis of 2-methyl-1-bromobutane 0.35 mole (30.9 g) of (S)-(−)-2-methyl-1-butanol was stirred at 0° C., and 0.35 mole (94.7 g) of phosphorus tribromide was added dropwise thereto. Then the temperature was raised slowly to 70° C., nd the mixture was stirred for two hours. After the reaction, the reaction solution was added dropwise into water to decompose phosphorus tribromide, then ether extracted, dried, and concentrated, to obtain 17.4 g of 2-methyl-1-bromobutane (purity determined by gas chromatography: 95.2%). (yield: 33%)

Synthesis of 4'-(2-methylbutoxy-4-hydroxybiphenyl

A solution of 0.20 mole (37.2 g) of 4,4'-dihydroxybiphenyl, 0.10 mole (15.1 g) of the above 2-methyl-1-bromobutane, and 0.60 mole (33.7 g) of potassium carbonate in 300 ml of ethanol was refluxed for 16 hours. After the reaction, the reaction solution was filtered and concentrated, then purified by column chromatography to obtain 4.9 g of 4'-(2-methylbutoxy)-4-hydroxybiphenyl. (yield: 58%)

Synthesis of
4'-(12-acryloyloxydodecyloxy)-4-(2-methylbutoxy)-biphenyl

A solution of 50 m moles (15.9 g) of the bromoester compound (1d) obtained in Example 4, 55 m moles (14.1 g) of the above 4'-(2-methylbutoxy)-4-hydroxybiphenyl, and 0.20 mole (27.6 g) of potassium carbonate in 300 ml of acetone was refluxed for four hours. Then the reaction solution was filtered. The filtrate was concentrated, and then purified by column chromatography to obtain 15.3 g of the objective monomer (3j) [[$\alpha$]$_D^{23}$ = +2.88° (CHCl$_3$)]. (yield: 62%)

Synthesis of polymer 1.2 m moles (0.60 g) of the monomer (3j), 2.3 mg of AIBN, and 4 ml of dry THF were freeze-deaerated, then reacted for 16 hours t 60° C. After the reaction, the reaction solution was concentrated and diluted with chloroform (20 ml/g), then purified by high speed liquid chromatography to obtain 0.3 g of a polymer having Mn of 6,000. (conversion percentage: 50%)

EXAMPLE 11

Synthesis of
4'-(16-acryloyloxydodecyloxy)-4-(2-methylbutoxy)-biphenyl

A solution of 50 m moles (18.8 g) of the bromoester compound (1f) obtained in Example 6, 55 m moles (14.1 g) of 4'-(2-methylbutoxy)-4-hydroxybiphenyl obtained in Example 10, and 0.20 mole (27.6 g) of potassium carbonate in 300 ml of acetone was refluxed for four hours. Then, the reaction solution was filtered. The filtrate was concentrated, and then purified by column chromatography to obtain 16.8 g of the objective monomer (3k) [[$\alpha$]$_D^{23}$ = +2.70° (CHCl$_3$)]. (yield: 58%)

Synthesis of polymer 1.2 m moles (0.60 g) of the monomer (3k), 2.3 mg of AIBN, and 4 ml of dry THF were freeze-deaerated, then reacted for 16 hours at 60° C. After the reaction, the reaction solution was concentrated and diluted with chloroform (20 ml/g), then purified by high speed liquid chromatography to obtain 0.3 g of a polymer having Mn of 7,000. (conversion percentage: 68%)

EXAMPLE 12

Synthesis of 4'-methoxy-4-(2-methylbutyryl)biphenyl

A solution of 0.15 mole (15.0 g) of (S)-(+)-2-methylbutyric acid and 0.3 mole (35.5 g) of thionyl chloride in 100 ml of chloroform was refluxed for three hours. After chloroform and the excessive thionyl chloride had been distilled out at reduced pressure, the reaction solution was concentrated at reduced pressure to obtain 12.8 g of 2-methylbutyryl chloride. A suspension of 0.1 mole (13.3 g) of aluminum chloride in 100 ml of dry methylene chloride was cooled to 0° C., then 12.8 g of 2-methylbutyryl chloride was added dropwise thereto, and stirred for 30 min.. Maintaining the mixed solution at 0° C., a solution of 0.08 mole (14.7 g) of 4-methoxybiphenyl in 80 ml of dry methylene chloride was added dropwise, and stirred for 10 hours at room temperature. The reaction mixture was decomposed by adding into ice and dil. hydrochloric acid, and the organic layer was washed with dil.hydrochloric acid and an aquious sodium hydrogen carbonate solution, and then dried with magnesium sulfate. The concentrated product was purified by column chromatography to obtain 10.3 g of 4'-methoxy-4-(2-methylbutyryl)biphenyl. (yield: 48%)

Synthesis of 4'-methoxy-4-(2-methylbutyl)biphenyl 13.6 g of zinc powder, 1.4 g of mercury chloride, 0.7 ml of conc. hydrochloric acid, and 20 ml of water were mixed with shaking for five minutes, and then the supernatant solution was flowed out. To the obtained zinc amalgam, 10 ml of water, 24 ml of conc. hydrochloric acid, 1 ml of acetic acid, 14 ml of toluene, and 38 m moles (10.2 g) of 4'-methoxy-4-(2-methylbutyryl)biphenyl were added, and then refluxed for 20 hours. In the mean time, 5 ml portions of conc. hydrochloric acid was successively added every five hours. The reaction solution was cooled to room temperature, then, after the addition of water, ether extracted. The extract was washed with water, dried, and concentrated, and then purified by column chromatography, to obtain 7.1 g of 4'-methoxy-4-(2-methylbutyl)biphenyl. (yield: 74%)

Synthesis of 4'-(2-methylbutyl)-4-hydroxybiphenyl

A solution of 33 m moles (8.2 g) of boron tribromide in 25 ml of methylene chloride was cooled to −70° C., and a solution of 28 m moles (7.0 g) of 4'-methoxy-4-(2-methylbutyl)biphenyl in 150 ml of methylene chloride was added dropwise thereto. The mixture was returned to room temperature in 8 hours, and then stirred for five hours. After addition of water, the reaction mixture was extracted with methylene chloride, then purified by column chromatography to obtain 4.0 g of 4'-(2-methylbutyl)-4-hydroxybiphenyl. (yield: 60%)

Synthesis of
4'-(12-acryloyloxydodecyloxy)-4-(2-methylbutyl)biphenyl

A solution of 10 m moles (3.2 g) of the bromoester compound (4d) obtained in Example 4, 12 m moles (2.9 g) of the above 4'-(2-methylbutyl)-4-hydroxybiphenyl, and 40 m moles (5.5 g) of potassium carbonate in 40 ml of acetone was refluxed for four hours. The reaction solution was filtered. The filtrate was concentrated, and then purified by column chromatography to obtain 3.4 g of the objective monomer (31) [[$\alpha$]$_D^{23}$ = +2.59° (CHCl$_3$)].(yield: 69%)

Synthesis of polymer 1.2 m moles (0.60 g) of the monomer (31), 2.3 mg of AIBN, and 4 ml of dry THF were freeze-deaerated, thereafter reacted for 16 hours at 60° C. After the reaction, the reaction solution was concentrated and diluted with chloroform (20 ml/g), and then purified by high speed liquid chromatography to obtain 0.40 g of a polymer having Mn of 6,000. (conversion percentage: 67%)

EXAMPLE 13

Synthesis of 4'-(16-acryloyloxyhexadecyloxy)-4-(2-methylbutyl)-biphenyl

A solution of 10 m moles (3.8 g) of the bromoester compound (4f) obtained in Example 6, 12 m moles (2.9 g) of 4'-(2-methylbutyl)-4-hydroxybiphenyl obtained in Example 12, and 40 m moles (5.5 g) of potassium carbonate in 40 ml of acetone was refluxed for four hours. The reaction solution was filtered. The filtrate was concentrated, and then purified by column chromatography to obtain 3.2 g of the objective monomer (3m) [[$\alpha$]$_D^{23}$ = +2.81° (CHCl$_3$)]. (yield: 63%)

Synthesis of polymer 1.2 m moles (0.60 g) of the monomer (3m), 2.3 mg of AIBN, and 4 ml of dry THF were freeze-deaerated, then reacted for 16 hours at 60° C. After the reaction, the reaction solution was concentrated and diluted with chloroform (20 ml/g), then purified by high speed liquid chromatography to obtain 0.32 g of a polymer having Mn of 6,500. (conversion percentage: 53%)

EXAMPLE 14

Synthesis of 4-hydroxybenzoic acid 2-methylbutyl ester 0.29 mole (40.0 g) of 4-hydroxybenzoic acid and 0.35 mole (30.9 g) of (S)-(−)-2-methylbutanol were refluxed for 20 hours in 150 ml of toluene in the presence of 1 ml of conc. sulfuric acid. The reaction solution was concentrated, and then purified by column chromatography to obtain 53.2 g of 4-hydroxybenzoic acid 2-methylbutyl ester [[$\alpha$]$_D^{23}$ = +4.95° (CHCl$_3$)]. (yield: 88%)

Synthesis of 4-carbobenzoxyoxybenzoic acid

To an aqueous solution of 55 m moles (7.6 g) of 4-hydroxybenzoic acid and 65 m moles (2.6 g) of sodium hydroxide in 200 ml of water, 65 m moles (10.6 g) of carbobenzoxychloride was added dropwise at 0° C. After 24 hours, the precipitate was washed with water, filtered, and dried, then purified by column chromatography to obtain 15.0 g of 4-carbobenzoxyoxybenzoic acid [m.p. 181.9°-183.1° C.]. (yield: 99%)

Synthesis of 4-carbobenzoxyoxybenzoyl chloride

A solution of 27 m moles (7.3 g) of the above 4-carbobenzoxyoxybenzoic acid and 27 m moles (5.6 g) of phosphorus pentachloride in 50 ml of ether was stirred for 24 hours at room temperature. After the reaction, deetherizing was carried out, and the obtained crystal was recrystallized from hexane, to obtain 4.5 g of 4-carbobenzoxyoxybenzoyl chloride [m.p. 65.5°-67.4° C.]. (yield: 57%)

Synthesis of 4-(4'-carbobenzoxyoxybenzoyloxy)benzoic acid 2-methylbutyl ester A solution of 16 m moles (3.3 g) of the above 4-hydroxybenzoic acid 2-methylbutyl ester in 20 ml of THF and 40 ml of pyridine was cooled and a THF solution of 10 m moles (2.9 g) of the above 4-carbobenzoxyoxybenzoyl chloride was added dropwise. The mixture was returned slowly to room temperature, then stirred for 8 hours. After the reaction, the reaction mixture was ether extracted and concentrated, and then purified by column chromatography to obtain 2.9 g of 4-(4'-carbobenzoxyoxybenzoyloxy)benzoic acid 2-methylbutyl ester [m.p. 64.4°-65.4° C.]. (yield: 63%)

Synthesis of 1-(4'-hydroxybenzoyloxy)benzoic acid 2-methylbutyl ester

A solution of 6 m moles (2.8 g) of the above 4-(4'-carbobenzoxyoxybenzoyloxy)benzoic acid 2-methylbutyl ester and 0.5 g of palladium carbon (5% catalyst) in ethyl acetate was reacted for four hours in an atmosphere of hydrogen gas. After the reaction, palladium carbon had been filtered out suing membrane filter, the filtrate was concentrated, and then purified by column chromatography, to obtain 1.26 g of 1-(4'-hydroxybenzoyloxy)benzoic acid 2-methylbutyl ester [m.p. 90.8°-92.6° C.]. (yield: 64%)

Synthesis of 4-[4'-(12-acryloyloxydodecyloxy)benzoyloxy]benzoic acid 2-methylbutyl ester An acetone solution of 3.9 m moles (1.2 g) of the bromester compound (1d) obtained in Example 4, 3.3 m moles (1.1 g) of the above 1-(4'-hydroxybenzoyloxy)-benzoic acid 2-methylbutyl ester, and 15 m moles (2.1 g) of potassium carbonate was refluxed for 8 hours. After the reaction, the reaction solution was filtered and concentrated, then purified by column chromatography and recrystallized from ethanol, to obtain 0.99 g of the objective monomer (3n) [[$\alpha$]$_D^{23}$ = +2.11° (CHCl$_3$)]. (yield: 53%)

Synthesis of polymer 1.1 m moles (0.6 g) of the monomer (3n), 2.6 mg of AIBN, and 2 ml of dry THF were introduced in a glass ample and freeze-deaerated, thereafter reacted for 15 hours at 60° C. After the reaction, the reaction solution was concentrated and diluted with chloroform (20 ml/g), and then purified by high speed liquid chromatography to obtain 0.3 g of a polymer having Mn of 5,300. (conversion percentage: 50%)

EXAMPLE 15

Synthesis of 4-[4'-(14-acryloyloxytetradecyloxy) benzoyloxy] benzoic acid 2-methylbutyl ester A acetone solution of 13.9 m mole (4.8 g) of the bromoester compound (1e) obtained in Example 5, 3.3 m moles (4.4 g) of 1-(4'-hydroxybenzoyloxy)benzoic acid 2-methylbutyl ester obtained in Example 14, and 53 m moles (7.4 g) of potassium carbonate was refluxed for 8 hours. After the reaction, the reaction solution was filtered and concentrated, and then purified by column chromatography, and recrystallized from ethanol, to obtain 2.53 g of the objective monomer (3o) [[$\alpha$]$_D^{23}$ = +2.26° (CHCl$_3$)]. (yield: 32%)

Synthesis of polymer 1.01 m moles (0.60 g) of the monomer (3o) and 2.3 mg of AIBN and 9.5 ml of dry THF were freeze-deaerated, and then reacted for 16 hours at 60° C. After the reaction, the reaction solution was concentrated and diluted with chloroform (20 ml/g), then purified by high speed liquid chromatography, to obtain 0.35 g of a polymer having Mn of 6,500. (conversion percentage; 58%)

EXAMPLE 16

Synthesis of 4-[4'-(16-acryloyloxytetradecyloxy) benzoyloxy]benzoic acid 2-methylbutyl ester An acetone solution of 13.9 m moles (5.2 g) of the bromoester compound (1f) obtained in Example 6, 13.3 m moles (4.4 g) of 1-(4'-hydroxybenzoyloxy)benzoic acid 2-methylbutyl ester obtained in Example 14, and 53 m moles (7.4 g) of potassium carbonate was refluxed for 8 hours. After the reaction, the reaction solution was filtered and concentrated, and then purified by column chromatography, and recrystallized from ethanol, to obtain 2.46 g of the objective monomer (3p) [[α]$_D^{23}$ = +2.88° (CHCl$_3$)]. (yield: 30%)

Synthesis of polymer 0.96 m mole (0.60 g) of the monomer (3p), 2.3 mg of AIBN, and 9.5 ml of dry THF were freeze-deaerated, and then reacted for 16 hours at 60° C. After the reaction, the reaction solution was concentrated and diluted with chloroform (20 ml/g), then purified by high speed liquid chromatography to obtain 0.29 g of a polymer having Mn of 7,000. (conversion percentage: 49%)

EXAMPLE 17

Synthesis of 4'-(4''-hydroxybenzoyloxy)biphenyl-4-carboxylic acid 2-methylbutyl ester 42 m moles (5.8 g) of 4-hydroxybenzoic acid and 84 m moles (23.8 g) of the hydroxyester compound (2) obtained in Example 1 were refluxed for 36 hours in 150 ml of toluene in the presence of 2 ml of con. sulfuric acid. The reaction solution was concentrated, and then purified by column chromatography to obtain 9.5 g of 4'-(4''-hydroxybenzoyloxy)biphenyl-4-carboxylic acid 2-methylbutyl ester. (yield: 56%)

Synthesis of 4'-[4''-(6-acryloyloxyhexyloxy)benzoyloxy]biphenyl-4-carboxylic acid 2-methylbutyl ester A mixture of 32 m moles (7.5 g) of the bromoester compound (1b) obtained in Example 2, 25 m moles (10.1 g) of the above 4'-(4''-hydroxybenzoyloxy)biphenyl-4-carboxylic acid 2-methylbutyl ester, and 92 m moles (12.7 g) of potassium carbonate was refluxed for 6 hours in acetone. The reaction solution was filtered. The filtrate was concentrated, and then recrystallized from ethanol to obtain 6.0 g of the objective monomer (3q). [[α]$_D^{23}$ = +3.01° (CHCl$_3$)]. (yield: 43%)

Synthesis of polymer 0.94 m mole (600 mg) of the monomer (3q) was reacted for 14 hours at 60° C. in 4 ml of THF using 2.3 mg of AIBN as the polymerization initiator. The polymerization reaction product was purified by column chromatography to obtain 390 mg of a polymer having Mn of 7,000. (conversion percentage: 65%)

EXAMPLE 18

Synthesis of 4'-(4''-(10-acryloyloxydecyloxy)benzoyloxy]biphenyl-4-carboxylic acid 2-methylbutyl ester A mixture of 25 m moles (7.5 g) of the bromoester compound (1c) obtained in Example 4, 23 m moles (9.5 g) of 4'-(4''-hydroxybenzoyloxy)biphenyl-4-carboxylic acid 2-methylbutyl ester obtained in Example 17, and 92 m moles (12.7 g) of potassium carbonate was refluxed for 6 hours in acetone. The reaction solution was filtered. The filtrate was concentrated, and then recrystallized from ethanol to obtain 5.5 g of the objective monomer (3r). [[α]$_D^{23}$ = +2.93° (CHCl$_3$)]. (yield: 39%)]

Synthesis of polymer 0.98 m mole (600 mg) of the monomer (3r) was reacted for 14 hours at 60° C. in 4 ml of THF using 2.4 mg of AIBN as the polymerization initiator. The reaction product was purified by column chromatography to obtain 430 mg of a polymer having Mn of 6,000. (conversion percentage: 72%)

EXAMPLE 19

Synthesis of 4'-[4''-(12-acryloyloxydodecyloxy)benzoyloxy]biphenyl-4-carboxylic acid 2-methylbutyl ester A mixture of 32 m moles (10.2 g) of the bromoester compound (1d) obtained in Example 4, 25 m moles (10.0 g) of 4'-(4''-hydroxybenzoyloxy)biphenyl-4-carboxylic acid 2-methylbutyl ester obtained in Example 17, and 100 m moles (13.8 g) of potassium carbonate was refluxed for 6 hours in 300 ml of acetone. The reaction solution was filtered. The filtrate was concentrated, and then recrystallized from ethanol, to obtain 5.6 g of the objective monomer (3s). [[α]$_D^{23}$ = +2.90° (CHCl$_3$)]. (yield: 40%)

[phase transition behavior Cry $\underset{60}{\overset{60}{\rightleftarrows}}$ SmA $\underset{245}{\overset{256}{\rightleftarrows}}$ Iso]

Synthesis of polymer 0.94 m mole (600 mg) of the monomer (3s) was reacted for 14 hours at 60° C. using 2.3 mg of AIBN as the polymerization initiator. The polymerization reaction product was purified by column chromatography to obtain 504 mg of a polymer having Mn of 8,000 (conversion percentage: 84%)

EXAMPLE 20

Synthesis of 4'-[4''-(14-acryloyloxytetradecyloxy)benzoyloxy]biphenyl-4-carboxylic acid 2-methylbutyl ester A mixture of 9 m moles (3.1 g) of the bromoester compound (1e) obtained in Example 5, 7 m moles (2.8 g) of the above 4'-(4''-hydroxybenzoyloxy)biphenyl-4-carboxylic acid 2-methylbutyl ester, and 28 m moles (3.9 g) of potassium carbonate was refluxed for 6 hours in 30 ml of acetone. The reaction solution was filtered. The filtrate was concentrated, and then recrystallized from ethanol to obtain 1.1 g of the objective monomer (3t). [[α]$_D^{23}$ = +2.79° (CHCl$_3$)]. (yield: 24%)

Synthesis of polymer 0.89 m mole (0.6 g) of the monomer (3t), 2.3 mg of AIBN, and 9.5 ml of dry THF were freeze-dried, then reacted for 16 hours at 60° C. After the reaction, the reaction solution was concentrated and diluted with chloroform (20 ml/g), and then purified by high speed liquid chromatography, to obtain 0.37 g of a polymer having Mn of 7,500. (conversion percentage: 62%)

EXAMPLE 21

Synthesis of acrylic acid 15-bromopentadecyl ester 0.15 mole (10.8 g) of acrylic acid and 0.15 mol (27.2 g) of tetramethylammonium hydroxide pentahydrate were stirred in 500 ml of DMF, then 0.23 mole (85.1 g) of 1,15-dibromopentadecane was added to the reaction solution, and stirred for four hours. After addition of 300 ml of water, the reaction solution was ether extracted, dried, and concentrated, then purified by column chromatography, to obtain 21.7 g of the objective bromoester compound (1h). (yield: 40%)

Synthesis of 4'-[4'''-(15-acryloyloxypentadecyloxy)benzoyloxy]biphenyl-4-carboxylic acid 2-methylbutyl ester A mixture of 9 m moles (3.3 g) of the above bromoester compound (1h), 7 m moles (2.8 g) of the above 4'-(4''-hydroxybenzoyloxy)biphenyl-4-carboxylic acid 2-methylbutyl ester, and 28 m moles (3.9 g) of potassium carbonate was refluxed for 6 hours in 30 ml of acetone. The reaction solution was filtered. The filtrate was concentrated, and then recrystallized from ethanol to obtain 1.1 g of the objective monomer (3u). [[α]$_D^{23}$=+2.86° (CHCl$_3$)]. (yield: 23%)

Synthesis of polymer 0.88 m mole (0.6 g) of the monomer (3u), 2.3 mg of AIBN, asnd 9.5 ml of dry THF were freeze-dried, then reacted for 16 hours at 60° C. After the reaction, the reaction solution was concentrated and diluted with chloroform (20 ml/g), and then purified by high speed liquid chromatography, to obtain 0.40 g of a polymer having Mn of 7,500. (conversion percentage: 67%)

EXAMPLE 22

Synthesis of 4'-[4'''-(16-acryloyloxyhexadecyloxy)benzoyloxy]biphenyl-4-carboxylic acid 2-methylbutyl ester A mixture of 9 m moles (3.4 g) of the bromoester compound (1f) obtained in Example 6, 7 m moles (2.8 g) of the above 4'-(4''-hydroxybenzoyloxy)biphenyl-4-carboxylic acid 2-methylbutyl ester, and 28 m moles (3.9 g) of potassium carbonate was refluxed for 6 hours in 30 ml of acetone. The reaction solution was filtered. The filtrate was concentrated, and then recrystallized from ethanol to obtain 1.3 g of the objective monomer (3v) [[α]$_D^{23}$=+2.83° (CHCl$_3$)]. (yield: 27%)

Synthesis of polymer 0.86 m mole (0.6 g) of the monomer (3v), 2.3 mg of AIBN, and 9.5 ml of dry THF were freeze-dried, then reacted for 16 hours at 60° C. After the reaction, the reaction solution was concentrated and diluted with chloroform (20 ml/g), and then purified by high speed liquid chromatography, to obtain 0.25 g of a polymer having Mn of 7,500. (conversion percentage: 41%)

EXAMPLE 23

Synthesis of 4-(12-hydroxydodecyloxy)benzoic acid

A solution of 0.13 mole (17.6 g) of 4-hydroxybenzoic acid, 20 g of potassium hydroxide, and 1 g of potassium iodide in a mixed solvent of 45 ml of ethanol and 20 ml of water was stirred for 10 min., then 0.13 m mole of 12-bromo-1-dodecanol was added dropwise thereto, and refluxed for 6 hours. After the reaction, the reaction solution was ether extracted. Dil.hydrochloric acid was added to the extrate to deposit precipitate. The precipitate was filtered out, and then dried, to obtain 23.2 g of the hydroxycarboxylic acid. (yield: 56%)

Synthesis of 4-(12-acryloyloxydodecyloxy)benzoic acid

A solution of 50 m moles (15.9 g) of the above hydroxycarboxylic acid, 0.6 mole (43.2 g) of acrylic acid, 0.3 g of p-toluenesulfonic acid, and 0.3 g of hydroquinone in 30 ml of chloroform was refluxed for 30 hours. The reaction solution was disolved in warm ether, and washed with warm water, then concentrated. The concentrate was purified by column chromatography to obtain 6.5 g of the ester compound. (yield: 35%)

Synthesis of 4'-carbobenzoxyoxybiphenyl-4-carboxylic acid 2-chloropropyl ester 61.5 m moles (22.6 g) of 4'-carbobenzoxyoxybiphenyl-4-carboxylic acid chloride was added dropwise into a THF solution of 61.5 m moles (5.2 g) of (R)-(−)-2-chloro-1-propanol and 10 ml of triethylamine, and stirred for 6 hours. After the reaction, the reaction solution was ether extracted. The extrate was purified by column chromatography to obtain 15.9 g of the ester compound [[α]$_D^{23}$=+22.5° (CHCl$_3$)]. (yield: 61%)

Synthesis of 4'-hydroxybiphenyl-4-carboxylic acid 2-chloropropyl ester 30 m moles (12.8 g) of the above ester compound and 2 g of 5% palladium-carbon were suspended in ethyl acetate, and stirred for four hours in an atmosphere of hydrogen gas. The reaction solution was filtered using a membrane filter, and then the filtrate was purified by column chromatography, to obtain 8.0 g of the hydroxyester compound [[α]$_D^{23}$=−23.9° (CHCl$_3$)]. (yield: 92%)

Synthesis of 4'-[4'''-(12-acryloyloxydodecyloxy)benzoyloxy]biphenyl-4-carboxylic acid 2-chloropropyl ester The above ester compound was converted to acid chloride with thionyl chloride, and then the obtained acid chloride was disolved in THF to form a THF solution. To a solution of 10 m moles of the above hydroxyester compound and 5 ml of triethylamine in 20 ml of THF, a THF solution of 10 m moles (3.9 g) of the acid chloride was added dropwise, and then stirred for 6 hours. After the addition of water, the reaction solution was ether extracted, and then purified by column chromatography, to obtain 3.8 g of the objective monomer (3w) [[α]$_D^{23}$=−9.11° (CHCl$_3$)]. (yield: 59%)

Synthesis of polymer 0.93 m mole (0.6 g) of the monomer (3w), 2.3 mg of AIBN, and 9.5 ml of dry THF were freeze-dried, and then reacted for 16 hours at 60° C. After the reaction, the reaction solution was concentrated and diluted with chloroform (20 ml/g), and then purified by high speed liquid chromatography, to obtain 0.35 g of a polymer having Mn of 6,000. (conversion percentage: 58%)

EXAMPLE 24

Synthesis of 4'-hydroxybiphenyl-4-carboxylic acid ethyl ester 1 ml of conc. sulfuric acid was added to an ethanol solution of 0.1 mole (21.4 g) of 4'-hydroxybiphenyl-4-carboxylic acid, and stirred for 18 hours. The reaction solution was concentrated, and then purified by column chromatography, to obtain 22.8 g of 4'-hydroxybiphenyl-4-carboxylic acid ethyl ester [m.p. 144.4°–145.6° C.]. (yield: 97%)

Synthesis of 4'-(12-bromododecyloxy)biphenyl-4-carboxylic acid ethyl ester

An acetone solution of 90 m moles (21.8 g) of the above 4'-hydroxybiphenyl-4-carboxylic acid ethyl ester, 0.15 mole (49.2 g) of 1,12-dibromododecane, and 0.4 mole (55.3 g) of potassium carbonate was refluxed for four hours. The reaction solution was filtered. The filtrate was concentrated, and then purified by column chromatography, to obtain 29.5 g of 4'-(12-bromododecyloxy)biphenyl-4-carboxylic acid ethyl ester [m.p. 88.6°–90.5° C.]. (yield: 67%)

Synthesis of
4'-(12-acetyloxydodecyloxy)biphenyl-4-carboxylic acid ethyl ester 60 m moles (10.9 g) of tetramethylammonium hydroxide pentahydrate was added to a DMF solution of 60 m moles (3.6 g) of acetic acid, and stirred for one hour, then 50 m moles (24.5 g) of the above 4'-(12-bromododecyloxy)biphenyl-4-carboxylic acid ethyl ester was added thereto, and stirred for 12 hours. After the reaction, the reaction solution was ether extracted. The extrate was concentrated, and then purified by column chromatography, to obtain 15.7 g of 4'-(12-acetyloxydodecyloxy)biphenyl-4-carboxylic acid ethyl ester [m.p. 80.1°–81.5° C.]. (yield: 67%)

Synthesis of
4'-(12-hydroxydodecyloxy)biphenyl-4-carboxylic acid 30 m moles (14.1 g) of the above 4'-(12-acetyloxydodecyloxy)biphenyl-4-carboxylic acid ethyl ester and 10 g of sodium hydroxide were stirred for 10 min. at 70° C. in 40 ml of ethanol and 80 ml of water. After the reaction, the reaction solution was concentrated to obtain 11.7 g of 4'-(12-hydroxydodecyloxy)biphenyl-4-carboxylic acid. (yield: 98%)

Synthesis of
4'-(12-acryloyloxydodecyloxy)biphenyl-4-carboxylic acid 28 m moles (11.0 g) of the above 4'-(12-hydroxydodecyloxy)biphenyl-4-carboxylic acid, 0.5 g of p-toluenesulfonic acid, and 0.5 g of hydroquinone were refluxed for 16 hours in a mixed solvent of equal portions of chloroform and acrylic acid to carry out the dehydration reaction. After the reaction, the reaction solution was concentrated, and washed with ethanol, then purified by column chromatography, to obtain 4.06 g of 4'-(12-acryloyloxydodecyloxy)biphenyl-4-carboxylic acid. (yield: 32%)

Synthesis of
4-[4''-(12-acryloyloxydodecyloxy)biphenyl-4'-carbonyloxy]benzoic acid 2-methylbutyl ester 3 ml of thionyl chloride was added into a toluene solution of 9.0 m moles (4.06 g) of the above 4'-(12-acryloyloxydodecyloxy)biphenyl-4-cacroboxylic acid and 0.05 g of 2,6-di-tert-butyl-p-cresol. and the temperature was raised to 80° C. with stirring. Subsequently, a THF solution of 12 m moles (2.5 g) of 4-hydroxybenzoic acid 2-methylbutyl ester obtained in Example 14 and 4 ml of triethylamine was cooled to 0° C., and the acid chloride obtained above was introduced thereto. The temperature was returned to the room temperature slowly, and stirring was carried out for 6 hours. The reaction solution was ether extracted, washed with dil.hydrochloric acid aqueous solution, dried, and concentrated, and then purified by column chromatography, to obtain 2.77 g of the objective monomer (3x) [[$\alpha$]$_D^{23}$=+2.88° (CHCl$_3$)]. (yield: 48%)

Synthesis of polymer 0.94 m mole (0.60 g) of the monomer (3x), 2.3 mg of AIBN, and 9.5 ml of THF were freeze-deaerated, and then reacted for 16 hours at 60° C. After the reaction, the reaction solution was concentrated and purified by high speed liquid chromatography to obtain 0.30 g of a polymer having Mn of 6,000. (conversion percentage 50%)

EXAMPLE 25

Synthesis of
4'-(16-bromohexadecyloxy)biphenyl-4-carboxylic acid ethyl ester

An acetone solution of 90 m moles (21.8 g) of 4'-hydroxybiphenyl-4-carboxylic acid ethyl ester obtained in Example 24, 0.15 mole (57.6 g) of 1,16-dibromohexadecane, and 0.4 mole (55.3 g) of potassium carbonate was refluxed for four hours. The reaction solution was filtered. The filtrate was concentrated, and then purified by column chromatography to obtain 34.4 g of 4'-(16-bromohexadecyloxy)biphenyl-4-carboxylic acid ethyl ester. (yield: 70%)

Synthesis of
4'-(16-acetyloxyhexadecyloxy)biphenyl-4-carboxylic acid ethyl ester 60 m moles (10.9 g) of tetramethylammonium hydroxide pentahydrate was added into a DMF solution of 60 m moles (3.6 g) of acetic acid, stirred for one hour, then 50 m moles (27.3 g) of the above 4'-(16-bromohexadecyloxy)biphenyl-4-carboxylic acid ethyl ester was added, and stirred for 12 hours. The reaction solution was ether extracted and concentrated, then purified by column chromatography to obtain 18.1 g of 4'-(16-acetyloxyhexadecyloxy)biphenyl-4-carboxylic acid ethyl ester. (yield: 69%)

Synthesis of
4'-(16-hydroxyhexadecyloxy)biphenyl-4-carboxylic acid 30 m moles (15.7 g) of the above 4'-(16-acetyloxyhexadecyloxy)biphenyl-4-carboxylic acid ethyl ester and 10 g of sodium hydroxide were stirred for 10 min. at 70° C. in a mixed solution of 40 ml of ethanol and 80 ml of water. After the reaction, the reaction solution was concentrated to obtain 13.0 g of 4'-(16-hydroxyhexadecyloxy)biphenyl-4-carboxylic acid. (yield: 95%)

Synthesis of
4'-(16-acryloyloxyhexadecyloxy)biphenyl-4-carboxylic acid 28 m moles (12.7 g) of the above 4'-(16-hydroxyhexadecyloxy)biphenyl-4-carboxylic acid, 0.5 g of p-toluene sulfonic acid, and 0.5 g of hydroquinone were refluxed for 16 hours in a mixed solvent of equal portions of chloroform and acrylic acid for 16 hours to carry out the dehydration reaction. After the reaction, the reaction solution was concentrated and washed with ethanol, then purified by column chromatography, to obtain 5.55 g of 4'-(16-acryloyloxydodecyloxy)biphenyl-4-carboxylic acid. (yield: 39%)

Synthesis of 4-[4"-(16-acryloyloxyhexadecyloxy)biphenyl-4'-carbonyloxy]benzoic acid 2-methylbutyl ester 3 ml of thionyl chloride was added into a toluene solution of 9.0 m moles (4.6 g) of the above 4'-(16-acryloyloxydodecyloxy)biphenyl-4-carboxylic acid and 0.05 g of 2,6-di-tert-butyl-p-cresol, and the temperature was raised to 80° C. with stirring. The solution was reacted for one hour, and then concentrated. Then, a THF solution of 12 m moles (2.5 g) of 4-hydroxybenzoic acid 2-methylbutyl ester obtained in Example 14 and 4 ml of triethylamine was cooled to 0° C., and the acid chloride above obtained was introduced thereto. The temperature was returned to the room temperature slowly, and stirring was carried out for 6 hours. The reaction solution was ether extracted, washed with a dil.hydrochloric acid aqueous solution, dried, and concentrated, and then purified by column chromatography, to obtain 2.77 g of the objective monomer (3y) $[[\alpha]_D^{23} = +2.99° \ (CHCl_3)]$. (yield: 42%)

Synthesis of polymer 0.86 m mole (0.60 g) of the monomer (3y), 2.3 mg of AIBN and 9.5 ml of THF were freeze-deaerated, then reacted for 16 hours at 60° C. After the reaction, the reaction solution was concentrated and purified by high speed liquid chromatography to obtain 0.25 g of a polymer having Mn of 6,000. (conversion percentage; 41%)

EXAMPLE 26

Synthesis of 4-carbobenzoxyoxybenzoic acid 1-methyl propyl ester

A THF solution of 0.1 mole of (S)-(+)-2-butanol and 0.1 mole of triethylamine was stirred at 0° C., and a THF solution of 0.12 mole of 4-carbobenzoxyoxybenzoic acid chloride was added dropwise. The temperature was returned to the room temperature slowly, and stirring was carried out for 8 hours. After the reaction, the reaction solution was ether extracted, dried, concentrated, and purified by column chromatography, to obtain 5.7 g of 4-carbobenzoxyoxybenzoic acid 1-methylpropyl ester. (yield: 18%)

Synthesis of 4-hydroxybenzoic acid 1-methylpropyl ester

A solution of 10 m moles (3.1 g) of the above 4-carbobenzoxyoxybenzoic acid 1-methylpropyl ester and 0.5 g of palladium carbon (5% catalyst) in 40 ml of ethyl acetate was reacted for four hours in an atmosphere of hydrogen gas. After the reaction, palladium carbon was filtered out using a membrane filter, and the filtrate was concentrated, then purified by column chromatography to obtain 1.7 g of 4-hydroxybenzoic acid 1-methylpropyl ester. (yield: 86%)

Synthesis of 4-[4"-(12-acryloyloxydodecyloxy)biphenyl-4'-carbonyloxy]benzoic acid 1-methylpropyl ester 3 ml of thionyl chloride was added into a toluene solution of 7 m moles (3.16 g) of 4'-(12-hydroxydodecyloxy) biphenyl-4-carboxylic acid obtained in Example 24 and 0.05 g of 2,6-di-tert-butyl-p-cresol, and the temperature was raised to 80° C. with stirring. The solution was reacted for one hour, and then concentrated to obtain an acid chloride. Then, a THF solution of 5 m moles (0.97 g) of the above 4-hydroxybenzoic acid 1-methylpropyl ester and 2 ml of triethylamine was cooled to ice temperature, and the acid chloride above obtained was introduced thereto. The temperature was returned to the room temperature slowly, and stirring was carried out for 6 hours. The reaction solution was ether extracted, washed with dil.hydrochloric aqueous solution, dried, and concentrated, then purified by column chromatography, to obtain 1.82 g of the objective monomer (3z) $[[\alpha]_D^{23} = +7.90° \ (CHCl_3)]$. (yield: 45%)

Synthesis of polymer 0.88 m mole (0.60 g) of the monomer (3z), 2.3 mg of AIBN and 9.5 ml of THF were freeze-deaerated, then reacted for 16 hours at 60° C. After the reaction, the reaction solution was concentrated, and purified by high speed liquid chromatography, to obtain 0.31 g of a polymer having Mn of 6,000. (conversion percentage: 50%)

EXAMPLE 27

Synthesis of 4-carbobenzoxyoxybenzoic acid 1-methylbutyl ester

A THF solution of 0.1 mole of (L)-(−)-2-pentanol and 0.1 mole of triethylamine was stirred t 0° C., and a THF solution of 0.12 mole of 4-carbobenzoxyoxybenzoyl chloride was added dropwise. The temperature was returned to the room temperature slowly, and stirring was carried out for 8 hours. After the reaction, the reaction solution was ether extracted, dried, and concentrated, then purified by column chromatography, to obtain 4.4 g of 4-carbobenzoxyoxybenzoic acid 1-methylbutyl ester. (yield: 13%)

Synthesis of 4-hydroxybenzoic acid 1-methylbutyl ester

A solution of 10 m moles of the above 4-carbobenzoxyoxybenzoic acid 1-methylbutyl ester, 0.5 g of palladium carbon (5% catalyst) in 40 ml of ethyl acetate was reacted for four hours in an atmosphere of hydrogen gas. After the reaction, palladium carbon was filtered out using a membrane filter, and the filtrate was concentrated and purified by column chromatography to obtain 1.9 g of 4-hydroxybenzoic acid 1-methylbutyl ester. (yield: 89%)

Synthesis of 4-[4"-(16-acryloyloxyhexadecyloxy)biphenyl-4'-carbonyloxy]benzoic acid 1-methylbutyl ester 3 ml of thionyl chloride was added into a toluene solution of 10 m moles (2.08 g) of 4'-(16-acryloyloxyhexadecyloxy) biphenyl-4-carboxylic acid obtained in Example 25 and 0.05 g of 2,6-di-tert-butyl-p-cresol, and the temperature was raised to 80° C. with stirring. After the reaction had been carried out for one hour, the reaction solution was concentrated to obtain an acid chloride. Then, a THF solution of 7 m moles (3.56 g) of the above 4-hydroxybenzoic acid 1-methylbutyl ester and 2 ml of triethylamine was cooled to 0° C., and the acid chloride obtained above was introduced thereto. The temperature was returned to the room temperature slowly, and stirring was carried out for 6 hours. The reaction solution was ether extracted, washed with a dil. hydrochloric acid aqueous solution, dried, and concentrated, then purified by column chromatography to obtain 3.03 g of the objective monomer (3za) $[[\alpha]_D^{23} = -12.6° \ (CHCl_3)]$. (yield: 62%)

Synthesis of polymer 0.86 m mole (0.60 g) of the monomer (3za), 2.3 mg of AIBN, and 9.5 ml of THF were freeze-deaerated, and then reacted for 16 hours at 60° C. After the reaction, the reaction solution was concentrated and purified by high speed liquid chromatography, to obtain 0.32 g of a polymer having Mn of 7,000. (conversion percentage: 53%)

EXAMPLE 28

Synthesis of p-hydroxybenzoic acid 1-methylheptyl ester 27.6 g of p-hydroxybenzoic acid and 39.0 g of (R)-2-octanol were refluxed for 10 hours in 300 ml of benzene in the presence of 0.5 ml of conc. sulfuric acid. Then, the reaction solution was cooled to the room temperature, and then concentrated and purified by column chromatography, to obtain 21.5 g of p-hydroxybenzoic acid 1-methylheptyl ester. (yield: 43%)

Synthesis of 4'-(10-bromodecyloxy)biphenyl-4-carboxylic acid ethyl ester

An acetone solution of 90 m moles (21.8 g) of 4-hydroxybiphenyl-4-carboxylic acid ethyl ester obtained in Example 24, 0.15 mole (45.0 g) of 1,10-dibromodecane, and 0.4 mole (55.3 g) of potassium carbonate was refluxed for four hours. The reaction solution was filtered. The filtrate was concentrated, and then purified by column chromatography, to obtain 29.9 g of 4'-(10-bromodecyloxy)biphenyl-4-carboxylic acid ethyl ester. (yield: 72%)

Synthesis of 4'-(10-acetyloxydecyloxy)biphenyl-4-carboxylic acid ethyl ester 60 m moles (10.9 g) of tetramethylammonium hydroxide pentahydrate was added to a DMF solution of 60 m moles (3.6 g) of acetic acid, and stirred for one hour, then 50 m moles (23.1 g) of the above 4'-(10-bromodecyloxy)biphenyl-4-carboxylic acid ethyl ester was added thereto, and stirred for 12 hours. The reaction solution was ether extracted and concentrated, and then purified by column chromoatography, to obtain 15.4 g of 4'-(10-acetyloxydecyloxy) biphenyl-4-carboxylic acid ethyl ester. (yield: 70%)

Synthesis of 4'-(10-hydroxydecyloxy)biphenyl-4-carboxylic acid 30 m moles (13.2 g) of the above 4'-(10-acetyloxydecyloxy) biphenyl-4-carboxylic acid ethyl ester and 10 g of sodium hydroxide were stirred for 10 min. at 70° C. in a mixed solvent of 40 ml of ethanol and 80 ml of water. After the reaction, the reaction solution was concentrated to obtain 10.8 g of 4'-(10-hydroxydecyloxy)biphenyl-4-carboxylic acid. (yield: 97%)

Synthesis of 4'-(10-acryloyloxydecyloxy)biphenyl-4-carboxylic acid 28 m moles (10.4 g) of the above 4'-(10-hydroxydecyloxy) biphenyl-4-carboxylic acid, 0.5 g of p-toluenesulfonic acid, and 0.5 g of hydroquinone were subjected to dehydrating reaction by refluxing for 16 hours in an mixed solvent of the equal amount of chloroform and acrylic acid. After the reaction, the reaction solution was concentrated, and purified by column chromatography to obtain 3.57 g of 4'-(10-acryloyloxydecyloy)biphenyl-4-carboxylic acid. (yield: 30%)

Synthesis of 4-[4''-(10-acryloyloxydecyloxy)biphenyl-4'-carbonyloxy]benzoic acid 1-methylheptyl ester 3 ml of thionyl chloride was added into a toluene solution of 9.0 m moles (3.84 g) of the above 4'-(10-acryloyloxydecyloxy) biphenyl-4-carboxylic acid and 0.05 g of 2,6-ti-tert-butyl-p-cresol, and the temperature was raised to 80° C. with stirring. After the reaction had been carried out for one hour, the reaction solution was concentrated. Then, a THF solution of 12 m moles (3.0 g) of the above 4-hydroxybenzoic acid 1-methylheptyl ester and triethylamine was cooled to 0° C., and the acid chloride obtained above was introduced thereto. The temperature was returned to the room temperature slowly, and stirring was carried out for 6 hours. The reaction solution was ether extracted, washed by a dil.-hydrochloric aqueous solution, dried, and concentrated, and then purified by column chromatography, to obtain 2.7 g of the objective monomer (3zb) [[$\alpha$]$_D^{23}$ = −19.3° (CHCl$_3$)]. (yield: 45%)

Synthesis of polymer 0.94 m mole (0.60 g) of the monomer (3zb), 2.3 mg of AIBN, and 9.5 ml of THF were freeze-deaerated, and reacted for 16 hours at 60° C. After the reaction, the reaction solution was concentrated, and purified by high speed liquid chromatography, to obtain 0.41 g of a polymer having Mn of 7,000. (conversion percentage: 68%)

TABLE

| Example | Recurring unit | Phase transition temperature (°C.) | Measuring temperature (°C.) | Response time (sec.) |
|---|---|---|---|---|
| Example 1 | –(CH$_2$CH)– / COO–(CH$_2$)$_2$–O–⟨phenyl⟩–⟨phenyl⟩–COO–CH$_2$CH(CH$_3$)CH$_2$C$_2$H$_5$* | g $\underset{38}{\overset{42}{\rightleftarrows}}$ SmC* $\underset{76}{\overset{81}{\rightleftarrows}}$ SmA $\underset{124}{\overset{128}{\rightleftarrows}}$ Iso | 71 | 0.18 |
| Example 2 | –(CH$_2$CH)– / COO–(CH$_2$)$_6$–O–⟨phenyl⟩–⟨phenyl⟩–COO–CH$_2$CH(CH$_3$)CH$_2$C$_2$H$_5$* | g $\underset{15}{\overset{19}{\rightleftarrows}}$ SmC* $\underset{65}{\overset{69}{\rightleftarrows}}$ SmA $\underset{85}{\overset{91}{\rightleftarrows}}$ Iso | 60 | 0.09 |
| Example 3 | –(CH$_2$CH)– / COO–(CH$_2$)$_{10}$–O–⟨phenyl⟩–⟨phenyl⟩–COO–CH$_2$CH(CH$_3$)CH$_2$C$_2$H$_5$* | (a) g $\underset{5}{\overset{6}{\rightleftarrows}}$ SmC* $\underset{35}{\overset{42}{\rightleftarrows}}$ SmA $\underset{94}{\overset{101}{\rightleftarrows}}$ Iso<br>(b) g $\underset{8}{\overset{12}{\rightleftarrows}}$ SmC* $\underset{47}{\overset{51}{\rightleftarrows}}$ SmA $\underset{107}{\overset{115}{\rightleftarrows}}$ Iso | 30<br>42 | 0.05<br>0.11 |
| Example 4 | –(CH$_2$CH)– / COO–(CH$_2$)$_{12}$–O–⟨phenyl⟩–⟨phenyl⟩–COO–CH$_2$CH(CH$_3$)CH$_2$C$_2$H$_5$* | Cry $\overset{41}{\rightarrow}$ SmA $\underset{110}{\overset{123}{\rightleftarrows}}$ Iso; $\searrow_{33}$ SmC* $\overset{39}{\nearrow}$ | 35 | 0.03 |
| Example 5 | –(CH$_2$CH)– / COO–(CH$_2$)$_{14}$–O–⟨phenyl⟩–⟨phenyl⟩–COO–CH$_2$CH(CH$_3$)CH$_2$C$_2$H$_5$* | Cry $\overset{69.5}{\rightarrow}$ SmA $\underset{98}{\overset{112}{\rightleftarrows}}$ Iso; $\searrow_{51}$ SmC* $\overset{57}{\nearrow}$ | 52 | 0.04 |
| Example 6 | –(CH$_2$CH)– / COO–(CH$_2$)$_{16}$–O–⟨phenyl⟩–⟨phenyl⟩–COO–CH$_2$CH(CH$_3$)CH$_2$C$_2$H$_5$* | Cry $\overset{71.5}{\rightarrow}$ SmA $\underset{97}{\overset{110}{\rightleftarrows}}$ Iso; $\searrow_{56}$ SmC* $\overset{59.7}{\nearrow}$ | 57 | 0.04 |
| Example 7 | –(CH$_2$CH)– / COO–(CH$_2$)$_{20}$–O–⟨phenyl⟩–⟨phenyl⟩–COO–CH$_2$CH(CH$_3$)CH$_2$C$_2$H$_5$* | Cry $\overset{84.5}{\rightarrow}$ SmA $\underset{92.5}{\overset{114}{\rightleftarrows}}$ Iso; $\searrow_{79}$ SmC* $\overset{81}{\nearrow}$ | 80 | 0.05 |
| Example 8 | –(CH$_2$CH)– / COO–(CH$_2$)$_{12}$–O–⟨phenyl⟩–⟨phenyl⟩–COO(CH$_2$)$_5$CH(CH$_3$)C$_2$H$_5$* | g $\underset{35}{\overset{53}{\rightleftarrows}}$ SmC* $\underset{58}{\overset{63}{\rightleftarrows}}$ SmA $\underset{105}{\overset{108}{\rightleftarrows}}$ Iso | 55 | 0.16 |

TABLE-continued

| Example | Recurring unit | Phase transition temperature (°C.) | Measuring temperature (°C.) | Response time (sec.) |
|---|---|---|---|---|
| Example 9 | -(CH₂CH)- COO-(CH₂)₁₂-O-⟨Ph⟩-⟨Ph⟩-OCOCH(CH₃)CH₂C₂H₅ * | Cry ⇌(73/51) SmC* ⇌(80/58) SmA ⇌(128/123) Iso; S₁ at 74 | 71 | 0.05 |
| Example 10 | -(CH₂CH)- COO-(CH₂)₁₂-O-⟨Ph⟩-⟨Ph⟩-OCH₂CH(CH₃)C₂H₅ * | Cry ⇌(67/48) SmC* ⇌64 SmA ⇌(141/131) Iso | 60 | 0.05 |
| Example 11 | -(CH₂CH)- COO-(CH₂)₁₆-O-⟨Ph⟩-⟨Ph⟩-OCH₂CH(CH₃)C₂H₅ * | Cry ⇌(87/73) SmC* ⇌80 SmA ⇌(130/124) Iso | 76 | 0.06 |
| Example 12 | -(CH₂CH)- COO-(CH₂)₁₂-O-⟨Ph⟩-⟨Ph⟩-CH₂CH(CH₃)C₂H₅ * | Cry ⇌(28/19) SmC* ⇌22 SmA ⇌(80/74) Iso | 20 | 0.06 |
| Example 13 | -(CH₂CH)- COO-(CH₂)₁₆-O-⟨Ph⟩-⟨Ph⟩-CH₂CH(CH₃)C₂H₅ * | Cry ⇌(42/36) SmC* ⇌38 SmA ⇌(77/71) Iso | 34 | 0.06 |
| Example 14 | -(CH₂CH)- COO-(CH₂)₁₂-O-⟨Ph⟩-COO-⟨Ph⟩-COOCH(CH₃)CH₂C₂H₅ * | Cry ⇌(13/5) SmC* ⇌12.5 SmA ⇌(110/95.7) Iso | 10 | 0.02 |
| Example 15 | -(CH₂CH)- COO-(CH₂)₁₄-O-⟨Ph⟩-COO-⟨Ph⟩-COOCH(CH₃)CH₂C₂H₅ * | Cry ⇌(38/13) SmC* ⇌31 SmA ⇌(104/92) Iso | 26 | 0.04 |
| Example 16 | -(CH₂CH)- COO-(CH₂)₁₆-O-⟨Ph⟩-COO-⟨Ph⟩-COOCH(CH₃)CH₂C₂H₅ * | Cry ⇌(35/21) SmC* ⇌29 SmA ⇌(98/86) Iso | 24 | 0.05 |

TABLE-continued

| | Recurring unit | Phase transition temperature (°C.) | Measuring temperature (°C.) | Response time (sec.) |
|---|---|---|---|---|
| Example 17 | $-(CH_2CH)-$ with $COO-(CH_2)_6-O-$–⟨Ph⟩–$COO$–⟨Ph⟩–⟨Ph⟩–$COOCH_2CHC_2H_5$ / $CH_3$ * | Cry $\xrightarrow{98}$ SmC* $\xrightarrow{}$ SmA $\underset{183}{\overset{195}{\rightleftarrows}}$ Iso; SmA←93, SmC*←79 | 88 | 0.07 |
| Example 18 | $-(CH_2CH)-$ with $COO-(CH_2)_{10}-O-$–⟨Ph⟩–$COO$–⟨Ph⟩–⟨Ph⟩–$COOCH_2CHC_2H_5$ / $CH_3$ * | Cry $\xrightarrow{90}$ SmC* $\xrightarrow{}$ SmA $\underset{195}{\overset{225}{\rightleftarrows}}$ Iso; SmA←87, SmC*←60 | 85 | 0.08 |
| Example 19 | $-(CH_2CH)-$ with $COO-(CH_2)_{12}-O-$–⟨Ph⟩–$COO$–⟨Ph⟩–⟨Ph⟩–$COOCH_2CHC_2H_5$ / $CH_3$ * | Cry $\underset{60}{\overset{60}{\rightleftarrows}}$ SmC* $\xrightarrow{122}$ SmA $\underset{216}{\overset{230}{\rightleftarrows}}$ Iso; SmA←120 | 112 | 0.05 |
| Example 20 | $-(CH_2CH)-$ with $COO-(CH_2)_{14}-O-$–⟨Ph⟩–$COO$–⟨Ph⟩–⟨Ph⟩–$COOCH_2CHC_2H_5$ / $CH_3$ * | Cry $\xrightarrow{120}$ SmC* $\xrightarrow{}$ SmA $\underset{198}{\overset{211}{\rightleftarrows}}$ Iso; SmA←109, SmC*←61 | 104 | 0.05 |
| Example 21 | $-(CH_2CH)-$ with $COO-(CH_2)_{15}-O-$–⟨Ph⟩–$COO$–⟨Ph⟩–⟨Ph⟩–$COOCH_2CHC_2H_5$ / $CH_3$ * | Cry $\xrightarrow{112}$ SmC* $\xrightarrow{}$ SmA $\underset{188}{\overset{201}{\rightleftarrows}}$ Iso; SmA←100, SmC*←60 | 95 | 0.05 |
| Example 22 | $-(CH_2CH)-$ with $COO-(CH_2)_{16}-O-$–⟨Ph⟩–$COO$–⟨Ph⟩–⟨Ph⟩–$COOCH_2CHC_2H_5$ / $CH_3$ * | Cry $\xrightarrow{103}$ SmC* $\xrightarrow{}$ SmA $\underset{177}{\overset{190}{\rightleftarrows}}$ Iso; SmA←91, SmC*←60 | 85 | 0.06 |
| Example 23 | $-(CH_2CH)-$ with $COO-(CH_2)_{17}-O-$–⟨Ph⟩–$COO$–⟨Ph⟩–⟨Ph⟩–$COOCH_2CHCH_3$ / $Cl$ * | Cry $\xrightarrow{91}$ SmC* $\xrightarrow{}$ SmA $\underset{256}{\overset{273}{\rightleftarrows}}$ Iso; SmA←82, SmC*←68 | 78 | 0.05 |
| Example 24 | $-(CH_2CH)-$ with $COO-(CH_2)_{17}-O-$–⟨Ph⟩–$COO$–⟨Ph⟩–⟨Ph⟩–$COOCH_2CHC_2H_5$ / $CH_3$ * | Cry $\xrightarrow{115}$ SmC* $\xrightarrow{}$ SmA $\underset{235}{\overset{247}{\rightleftarrows}}$ Iso; SmA←103, SmC*←61 | 97 | 0.05 |

TABLE-continued

| | Recurring unit | Phase transition temperature (°C.) | Measuring temperature (°C.) | Response time (sec.) |
|---|---|---|---|---|
| Example 25 | $-(CH_2CH)-$<br>$\quad\vert$<br>$COO-(CH_2)_6-O-\langle\bigcirc\rangle-\langle\bigcirc\rangle-COO-\langle\bigcirc\rangle-COOCH_2\overset{*}{C}HC_2H_5$<br>$\qquad\qquad\qquad\qquad\qquad\qquad\qquad\qquad\qquad\quad\vert$<br>$\qquad\qquad\qquad\qquad\qquad\qquad\qquad\qquad\qquad\;\;CH_3$ | Cry $\xrightarrow{113}$ SmA $\underset{202}{\overset{215}{\rightleftarrows}}$ Iso<br>$\underset{59}{\overset{}{\searrow}}\underset{}{\overset{101}{\nearrow}}$ SmC* | 30 | 0.05 |
| Example 26 | $-(CH_2CH)-$<br>$\quad\vert$<br>$COO-(CH_2)_{12}-O-\langle\bigcirc\rangle-\langle\bigcirc\rangle-COO-\langle\bigcirc\rangle-COOC_2H_5$<br>$\qquad\qquad\qquad\qquad\qquad\qquad\qquad\qquad\qquad\;\;\vert$<br>$\qquad\qquad\qquad\qquad\qquad\qquad\qquad\qquad\qquad CH_3$ | Cry $\underset{70}{\overset{120}{\rightleftarrows}}$ SmA $\underset{215}{\overset{230}{\rightleftarrows}}$ Iso<br>$\quad\underset{}{\overset{108}{\searrow\nearrow}}$ SmC* | 103 | 0.05 |
| Example 27 | $-(CH_2CH)-$<br>$\quad\vert$<br>$COO-(CH_2)_6-O-\langle\bigcirc\rangle-\langle\bigcirc\rangle-COO-\langle\bigcirc\rangle-COOC_3H_7$<br>$\qquad\qquad\qquad\qquad\qquad\qquad\qquad\qquad\qquad\;\vert$<br>$\qquad\qquad\qquad\qquad\qquad\qquad\qquad\qquad\qquad CH_3$ | Cry $\underset{55}{\overset{118}{\rightleftarrows}}$ SmA $\underset{216}{\overset{232}{\rightleftarrows}}$ Iso<br>$\quad\underset{}{\overset{106}{\searrow\nearrow}}$ SmC* | 100 | 0.04 |
| Example 28 | $-(CH_2CH)-$<br>$\quad\vert$<br>$COO-(CH_2)_{10}-O-\langle\bigcirc\rangle-\langle\bigcirc\rangle-COO-\langle\bigcirc\rangle-COOC_6H_{13}$<br>$\qquad\qquad\qquad\qquad\qquad\qquad\qquad\qquad\qquad\;\;\vert$<br>$\qquad\qquad\qquad\qquad\qquad\qquad\qquad\qquad\qquad CH_3$ | Cry $\underset{58}{\overset{71}{\rightleftarrows}}$ SmA $\underset{181}{\overset{188}{\rightleftarrows}}$ Iso<br>$\quad\underset{}{\overset{64}{\searrow\nearrow}}$ SmC* | 60 | 0.04 |

What is claimed is:

1. A ferroelectric liquid crystal polymer consisting essentially of the recurring units represented by the following general formula:

in which
k is an integer of from 1 to 30,
$R_1$ is

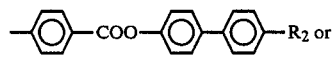

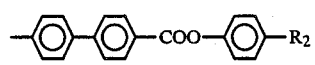

$R_2$ is —$COOR_3$, —$OCOR_3$, —$OR_3$, or —$R_3$,
in which
$R_3$ is

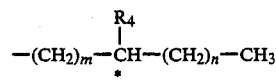

$R_4$ is —$CH_3$ or Cl,
m is 0 or an integer of from 1 to 10, and
n is 0 or an integer of from 1 to 10, providing that n is not 0 when $R_4$ is —$CH_3$ and having a number average molecular weight of from 3,000 to 400,00.

2. A ferroelectric liquid crystal polymer according to claim 1, wherein k is an integer of from 6 to 16, and m is 0 or an integer of from 1 to 5.

3. A ferroelectric liquid crystal polymer according to claim 1, wherein
k is an integer of from 10 to 16,
$R_2$ is

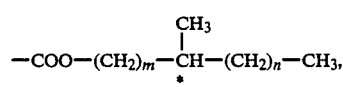

m is 0 or an integer of from 1 to 3, and
n is an integer of from 1 to 5.

4. A ferroelectric liquid crystal polymer according to claim 1, wherein
k is an integer of from 10 to 16,
$R_2$ is

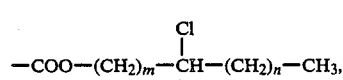

m is 0 or 1, and
n is 0 or an integer of from 1 to 5.

5. A ferroelectric liquid crystal polymer according to claim 1, wherein a number of average molecular weight of the polymer is from 5,000 to 200,000.

6. A ferroelectric liquid crystal polymer according to claim 3, wherein $R_2$ is

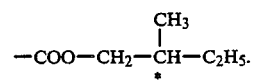

7. A ferroelectric liquid crystal polymer according to claim 3, wherein
k is 10, and
$R_1$ is

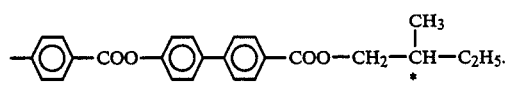

8. A ferroelectric liquid crystal polymer according to claim 3, wherein
k is 12, and
$R_1$ is

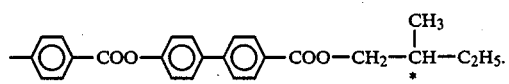

9. A ferroelectric liquid crystal polymer according to claim 3, wherein
k is 14, and
$R_1$ is

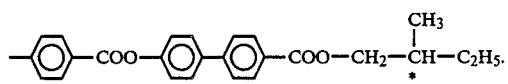

10. A ferroelectric liquid crystal polymer according to claim 3, wherein
k is 15, and
$R_1$ is

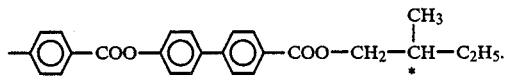

11. A ferroelectric liquid crystal polymer according to claim 3, wherein
k is 16, and
$R_1$ is

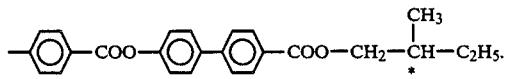

12. A ferroelectric liquid crystal polymer according to claim 3, wherein
k is 12, and
$R_1$ is

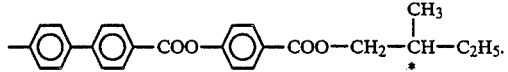

13. A ferroelectric liquid crystal polymer according to claim 3, wherein
k is 16, and
$R_1$ is

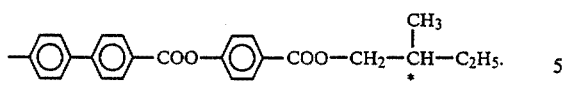
14. A ferroelectric liquid crystal polymer according to claim 3, wherein
k is 12, and
R₁ is
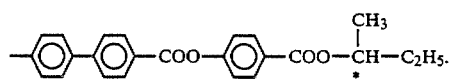
15. A ferroelectric liquid crystal polymer according to claim 3, wherein
k is 16, and
R₁ is
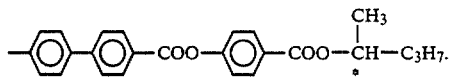
16. A ferroelectric liquid crystal polymer according to claim 3, wherein
k is 10, and
R₁ is
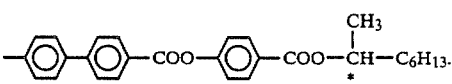
17. A ferroelectric liquid crystal polymer according to claim 4, wherein
k is 12, and
R₁ is
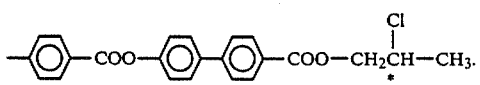
* * * * *